United States Patent
van de Burgt et al.

(10) Patent No.: US 10,614,016 B2
(45) Date of Patent: Apr. 7, 2020

(54) CONTROLLER AREA NETWORK (CAN) DEVICE AND METHOD FOR OPERATING A CAN DEVICE

(71) Applicant: NXP B.V., Eindhoven (NL)

(72) Inventors: Rolf van de Burgt, Oosterbeek (NL); Bernd Uwe Gerhard Elend, Hamburg (DE)

(73) Assignee: NXP B.V., Eindhoven (NL)

( * ) Notice: Subject to any disclaimer, the term of this patent is extended or adjusted under 35 U.S.C. 154(b) by 242 days.

(21) Appl. No.: 14/918,370

(22) Filed: Oct. 20, 2015

(65) Prior Publication Data

US 2017/0109309 A1   Apr. 20, 2017

(51) Int. Cl.
  G06F 1/08 (2006.01)
  G06F 13/40 (2006.01)
  H04L 12/40 (2006.01)
  H04L 12/413 (2006.01)

(52) U.S. Cl.
  CPC ............ *G06F 13/4031* (2013.01); *G06F 1/08* (2013.01); *H04L 12/4013* (2013.01); *H04L 12/40169* (2013.01); *H04L 12/4135* (2013.01); *H04L 2012/40215* (2013.01); *H04L 2012/40273* (2013.01)

(58) Field of Classification Search
  CPC ... G06F 13/4031; G06F 1/08; H04L 12/4013; H04L 12/40169; H04L 2012/40215; H04L 2012/40273; G04L 12/4135
  See application file for complete search history.

(56) References Cited

U.S. PATENT DOCUMENTS

| 7,647,131 | B1* | 1/2010 | Sadowski | .......... G05B 23/0297 |
| | | | | 700/108 |
| 8,566,632 | B2 | 10/2013 | van de Burgt et al. | |
| 9,262,365 | B2* | 2/2016 | Hartwich | .......... H04L 12/40032 |
| 2007/0153923 | A1* | 7/2007 | Pi | .......................... H04L 1/0017 |
| | | | | 375/260 |
| 2012/0185721 | A1* | 7/2012 | Burgt | ........................ G06F 1/12 |
| | | | | 713/400 |
| 2013/0103914 | A1* | 4/2013 | Mitsunobu | ............ H04L 43/024 |
| | | | | 711/154 |
| 2014/0153632 | A1* | 6/2014 | Malaga | ................ H04L 25/4902 |
| | | | | 375/239 |
| 2014/0270033 | A1* | 9/2014 | Richards | ................ H04L 7/0037 |
| | | | | 375/376 |
| 2016/0080168 | A1* | 3/2016 | Lieder | ............... H04L 12/40032 |
| | | | | 370/468 |

FOREIGN PATENT DOCUMENTS

WO   2006/057590 A1   6/2006

OTHER PUBLICATIONS

Richard, P. "Understanding Microchip's CAN Module Bit Timing ED", Microchip Technology Inc, pp. 1-14 (Jan. 1, 2001).

* cited by examiner

*Primary Examiner* — Tim T Vo
*Assistant Examiner* — Harry Z Wang
(74) *Attorney, Agent, or Firm* — Rajeev Madnawat (57) ABSTRACT

Embodiments of a method, a device and a computer-readable storage medium are disclosed. In an embodiment, a method for operating a Controller Area Network (CAN) device involves in response to receiving bits of an arbitration field of a CAN data frame at the CAN device, selecting a timing engine from a plurality of timing engines and sampling subsequent bits of the CAN data frame using the selected timing engine. The timing engines have different sample clock frequencies.

18 Claims, 9 Drawing Sheets

CONTROLLER AREA NETWORK (CAN) DEVICE AND METHOD FOR OPERATING A CAN DEVICE

BACKGROUND

Controller area network (CAN) bus is a message-based communications bus protocol that is often used within automobiles. The CAN bus protocol is used to enable communications between various electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. The data link layer of the CAN protocol is standardized as International Standards Organization (ISO) 11898-1. The standardized CAN data link layer protocol is in the process of being extended to provide higher data rates. The extended protocol, referred to as CAN Flexible Data-Rate or "CAN FD," is moving towards standardization in the form of an update of the existing ISO 11898-1 standard. The CAN bus protocol does not have dedicated clock lines between communicating devices and receiving devices. Consequently, CAN devices communicate without a common clock signal.

SUMMARY

Embodiments of a method, a device and a computer-readable storage medium are disclosed. In an embodiment, a method for operating a CAN device involves in response to receiving bits of an arbitration field of a CAN data frame at the CAN device, selecting a timing engine from timing engines and sampling subsequent bits of the CAN data frame using the selected timing engine. The timing engines have different sample clock frequencies.

In an embodiment, the method further comprises modifying at least some of sampled subsequent bits of the CAN data frame using the sample clock frequency of the selected timing engine.

In an embodiment, the CAN data frame further comprises a data field, and sampling the subsequent bits of the CAN data frame using the selected timing engine comprises sampling bits of the data field of the CAN data frame using the selected timing engine.

In an embodiment, modifying the at least some of the sampled subsequent bits of the CAN data frame comprises modifying at least some of the sampled bits of the data field using the sample clock frequency of the selected timing engine.

In an embodiment, selecting a timing engine comprises selecting a best timing engine and at least one candidate timing engine.

In an embodiment, the best timing engine and the at least one candidate timing engine sample the same data from the received bits of the arbitration field.

In an embodiment, the best timing engine exhibits the lowest timing error among the best timing engine and the at least one candidate timing engine.

In an embodiment, the method further comprises evaluating the best timing engine and the at least one candidate timing engine based on the subsequent bits of the CAN data frame.

In an embodiment, evaluating the best timing engine and the at least one candidate timing engine based on the subsequent bits of the CAN data frame comprises selecting a second timing engine with the lowest timing error among the best timing engine and the at least one candidate timing engine. The method further comprises sampling further bits of the CAN data frame that are received after the subsequent bits of the CAN data frame using the second timing engine.

In an embodiment, a CAN device includes timing engines and a timing engine resolver configured to, in response to receiving bits of an arbitration field of a CAN data frame at the CAN device, select a timing engine from the plurality of timing engines. The timing engines have different sample clock frequencies. The selected timing engine samples subsequent bits of the CAN data frame.

In an embodiment, the CAN device further includes a bit manipulation module configured to modify at least some of sampled subsequent bits of the CAN data frame using the sample clock frequency of the selected timing engine.

In an embodiment, the CAN data frame further comprises a data field, and the selected timing engine samples bits of the data field of the CAN data frame.

In an embodiment, the bit manipulation module is further configured to modify at least some of the sampled bits of the data field using the sample clock frequency of the selected timing engine.

In an embodiment, the timing engine resolver is further configured to select a best timing engine and at least one candidate timing engine.

In an embodiment, the best timing engine and the at least one candidate timing engine sample the same data from the received bits of the arbitration field.

In an embodiment, the best timing engine has the lowest timing error among the best timing engine and the at least one candidate timing engine.

In an embodiment, the timing engine resolver is further configured to evaluate the best timing engine and the at least one candidate timing engine based on the subsequent bits of the CAN data frame.

In an embodiment, the timing engine resolver is further configured to select a second timing engine with the lowest timing error among the best timing engine and the at least one candidate timing engine. The second timing engine samples further bits of the CAN data frame that are received after the subsequent bits of the CAN data frame.

In an embodiment, a non-transitory computer-readable storage medium contains program instructions for operating a CAN device. Execution of the program instructions by one or more processors of the computer system causes the one or more processors to perform steps comprising in response to receiving bits of an arbitration field of a CAN data frame at the CAN device, selecting a timing engine from a plurality of timing engines and sampling subsequent bits of the CAN data frame using the selected timing engine. The timing engines have different sample clock frequencies.

In an embodiment, the steps further comprise modifying at least some of the sampled subsequent bits of the CAN data frame using the sample clock frequency of the selected timing engine.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Techniques described herein can be applied to any type of in-vehicle networks (IVNs), including a Controller Area Network (CAN), a Local Interconnect Network (LIN), a Media Oriented Systems Transport (MOST) network, a FlexRay™ compatible network, and other types of IVNs. Although in some embodiments a specific type of IVN is described, it should be noted that the invention is not restricted to a specific type of IVN.

Figure 1:
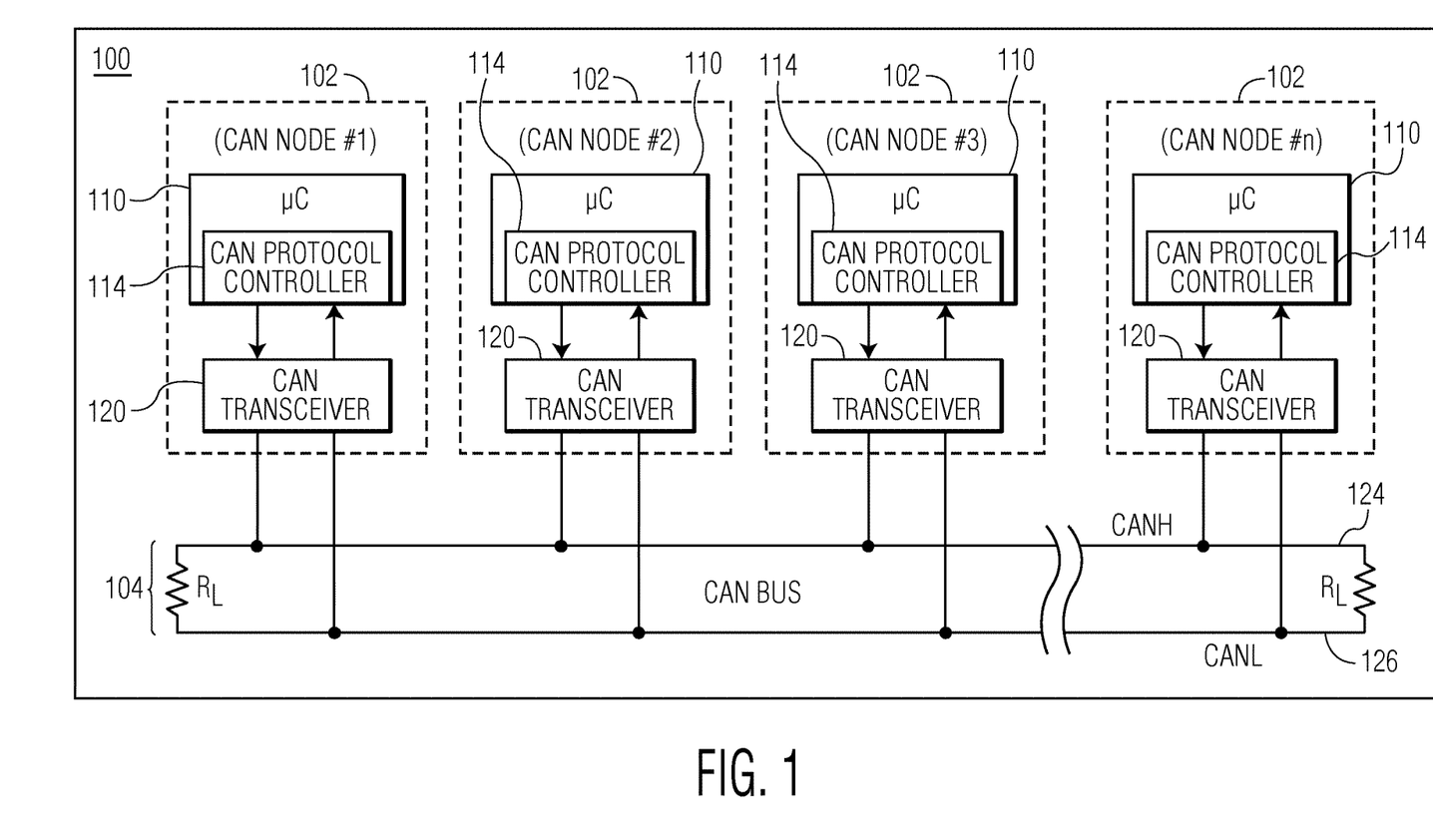
FIG. 1 depicts a CAN network that includes multiple CAN nodes connected to a CAN bus.

FIG. 1 depicts a CAN network 100 that includes multiple CAN nodes 102, also referred to as "ECUs," each connected to a CAN bus 104. In the embodiment of FIG. 1, each CAN node includes a microcontroller 110 having an embedded CAN protocol controller 114 and a CAN transceiver 120. The microcontrollers are typically connected to at least one device (not shown) such as a sensor, an actuator, or some other control device and are programmed to determine the meaning of received messages and to generate appropriate outgoing messages. The microcontrollers, also referred to as host processors, hosts, or digital signal processors (DSPs), are known in the field. In an embodiment, the host supports application software that interacts with the CAN protocol controller.

The CAN protocol controllers 114, which can be embedded within the microcontrollers 110 or external to the microcontrollers (e.g., a separate IC device), implement data link layer operations as is known in the field. For example, in receive operations, a CAN protocol controller stores received serial bits from the transceiver until an entire message is available for fetching by the microcontroller. The CAN protocol controller can also decode the CAN messages according to the standardized frame format of the CAN protocol. In transmit operations, the CAN protocol controller receives messages from the microcontroller and transmits the messages as serial bits in the CAN data frame format to the CAN transceiver.

The CAN transceivers 120 are located between the microcontrollers 110 and the CAN bus 104 and implement physical layer operations. For example, in receive operations, a CAN transceiver converts analog differential signals from the CAN bus to serial digital signals that the CAN protocol controller 114 can interpret. The CAN transceiver also protects the CAN protocol controller from extreme electrical conditions on the CAN bus, e.g., electrical surges. In transmit operations, the CAN transceiver converts serial digital bits received from the CAN protocol controller into analog differential signals that are sent on the CAN bus.

The CAN bus 104 carries analog differential signals and includes a CAN high (CANH) bus line 124 and a CAN low (CANL) bus line 126. The CAN bus is known in the field.

Figure 2:
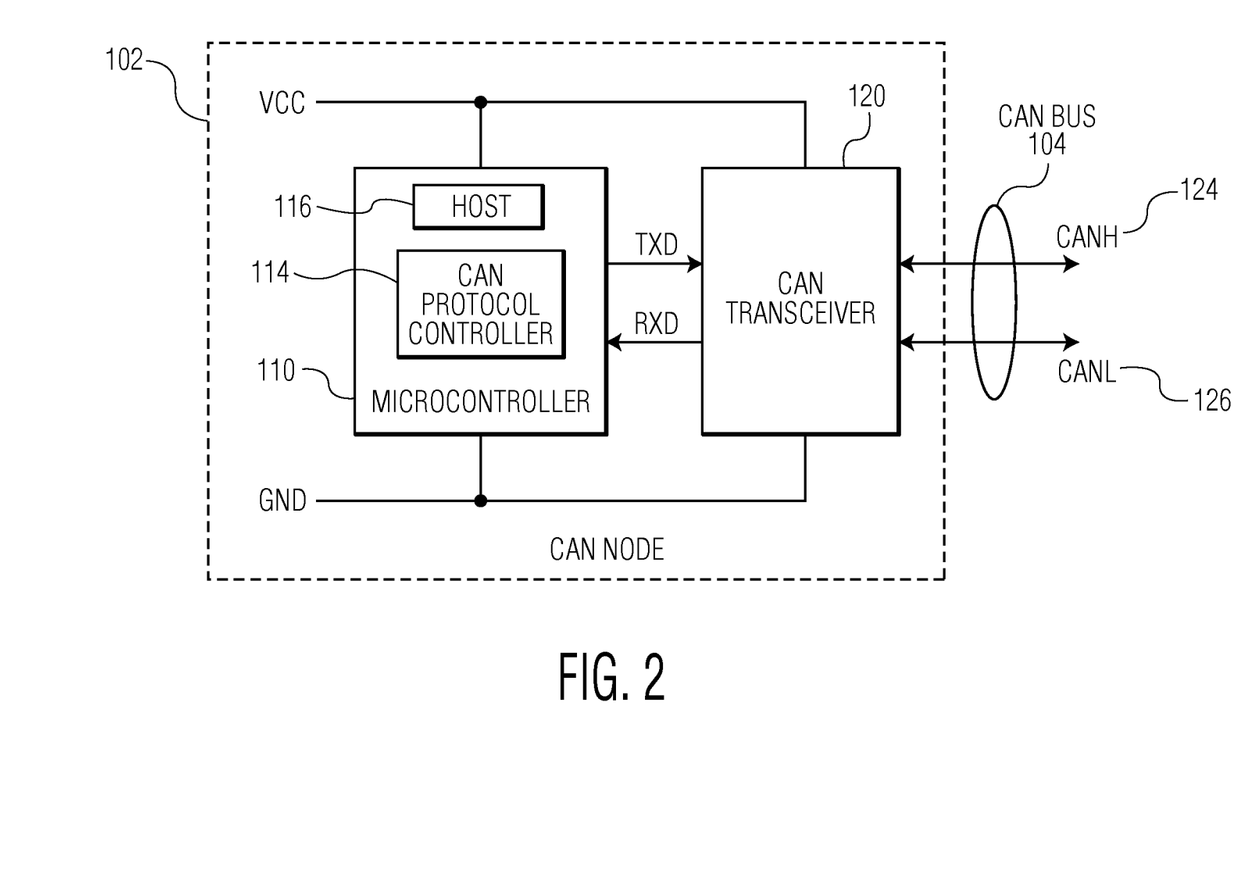
FIG. 2 depicts an expanded view of one CAN node from FIG. 1.

FIG. 2 depicts an expanded view of one CAN node 102 from FIG. 1. In the expanded view of FIG. 2, the microcontroller includes a host 116, which may be, for example, a software application that is stored in memory of the microcontroller and executed by processing circuits of the microcontroller. The microcontroller 110 and the CAN transceiver 120 of the CAN node are connected between a supply voltage, $V_{CC}$, and ground, GND. As illustrated in FIG. 2, data communicated from the microcontroller to the CAN transceiver is identified as transmit data (TXD) and data communicated from the CAN transceiver to the microcontroller is referred to as receive data (RXD). Throughout the description, TXD is carried on a TXD path and RXD is carried on an RXD path. Data is communicated to and from the CAN bus via the CANH and CANL bus lines 124 and 126, respectively.

As noted above, the CAN protocol controller 114 can be configured to support the normal mode or the flexible data rate mode. As used herein, "CAN normal mode" (also referred to as "Classical CAN mode") refers to frames that are formatted according to the ISO 11898-1 standard and "CAN FD mode" refers to frames that are formatted according to the emerging ISO/Draft International Standard (DIS) 11898-1 standard, or an equivalent thereof.

Figure 3:
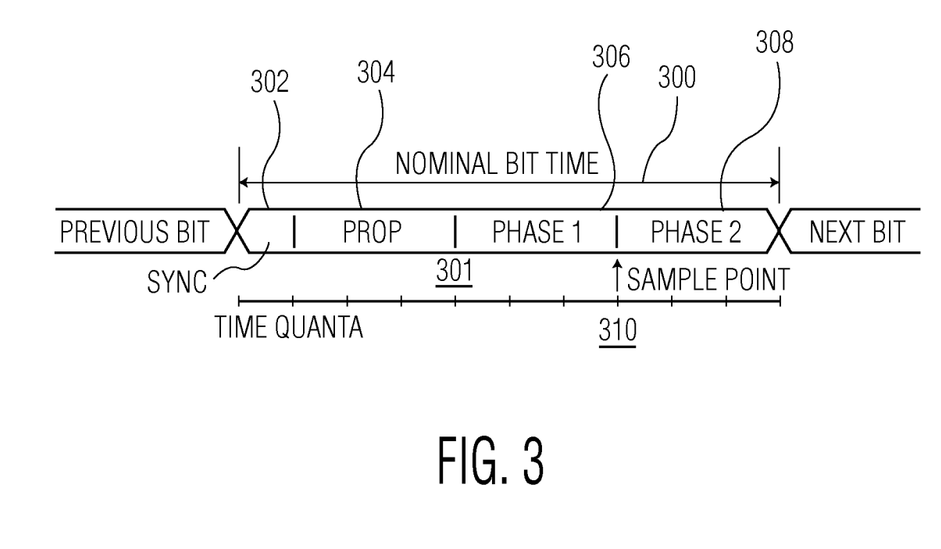
FIG. 3 depicts a Nominal Bit Time (NBT) defined in the CAN protocol.

In CAN devices, the internal clock base is extracted from received data and clock synchronization can occur on negative edges of the bits. For example, if a long string of the same value bit, for example 1's, is received, there is no negative edge to allow synchronization to occur. In order to limit the number of bits received before synchronization occurs, the CAN protocol uses bit stuffing. The CAN bit stuffing rule allows, at most, five consecutive bits with the same polarity, thus assuring that there are enough polarity changes in the data to synchronize sufficiently. For example, when five bits identical bits in a row are received, a stuffing bit of the opposite value may be put into the bit stream in order to force a transition. Under this rule, a synchronization will occur within at least every ten bits. FIG. 3 depicts a Nominal Bit Time (NBT) 300 as defined in the CAN protocol. In order to have a finer synchronization granularity than the NBT, Time Quantas (Tq) can be defined in a CAN bit. As depicted in FIG. 3, a CAN bit 301 is divided into a synchronization (Sync) segment 302, a Prop segment 304, and Phase 1 and Phase 2 segments 306, 308, which are related to physical delays in CAN communications. The Sync segment may be the part of the bit time used to synchronize the various CAN devices on the CAN bus. A synchronization edge may be expected within this segment. The Prop segment may be the part of the bit time used to compensate for physical delay times within the CAN network 100. These delay times may include the signal propagation time on the CAN bus and the internal delay time of the CAN receivers. The Phase 1 and Phase 2 segments may be used to compensate for edge phase errors. These segments may be lengthened or shortened by resynchronization. The data sampling point 310 is the point of time at which the bus level is read and interpreted as the value of that respective bit. The data sampling point is defined as the transition from Phase 1 to Phase 2. However, in some embodiments, a CAN transceiver 120 samples on each Tq. If a data edge is received in another segment than the Sync segment, the CAN transceiver's internal time base is shifted by X Tq, to align it with the time base of the incoming data. The maximum time shift is defined by the Sync Jump Width (SJW) parameter. In an embodiment, the NBT may be up to 25 Tq, while the SJW may be limited to 4 Tq.

In accordance with an embodiment of the invention, a CAN device includes timing engines having different sample clock frequencies and a timing engine resolver configured to, in response to receiving bits of an arbitration field of a CAN data frame at the CAN device, select a timing engine from the timing engines. The selected timing engine samples subsequent bits of the CAN data frame. By selecting a timing engine based on bits of the arbitration field of a CAN data frame and sampling subsequent bits of the CAN data frame using the selected timing engine, a matching sampling frequency can be determined on the fly during the reception of the CAN data frame. For example, a matching sampling frequency is a sampling frequency at which the sampled results match the received CAN frame data. Consequently, data modification can be made to a CAN data frame using a matching sampling frequency prior to the cyclic redundancy check (CRC) segment of the CAN data frame. For example, a CAN data frame formatted according to the CAN FD mode can be modified into a format that is understandable by a classic CAN device and does not cause the classic CAN device to enter an error state.

Figure 4:
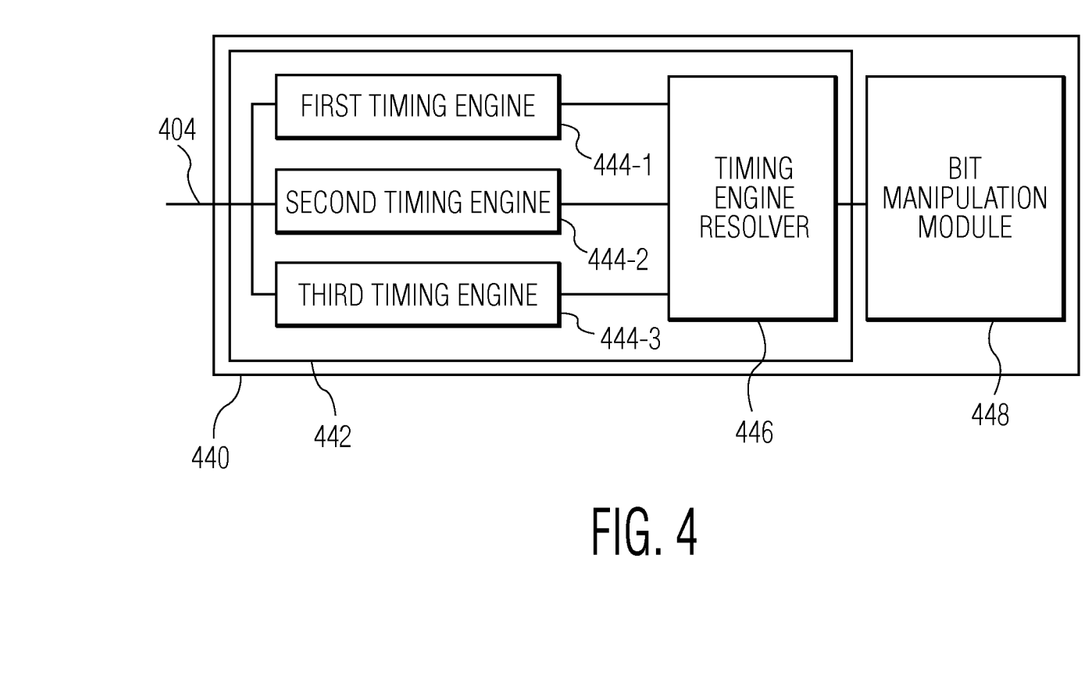
FIG. 4 depicts a CAN device that uses multiple timing engines running at different clock rates.

FIG. 4 depicts a CAN device 440 that uses multiple timing engines 444-1, 444-2, 444-3 running at different sample clock rates. The CAN device depicted in FIG. 4 may be an embodiment of the CAN node 102 depicted in FIGS. 1 and 2. In some embodiments, the CAN device depicted in FIG. 4 is an embodiment of the CAN transceiver 120 depicted in FIGS. 1 and 2. In the embodiment depicted in FIG. 4, a CAN device 440 includes a timing module 442 having multiple timing engines 444-1, 444-2, 444-3 and a bit manipulation module 448. The CAN device may be connected to a CAN bus 404 and receive data from other devices on a CAN network from the CAN bus. The timing module may receive data bits and may detect the timing information of the data. The timing module may then provide the received data message to the bit manipulation module for processing. In an embodiment, the timing module and the bit manipulation module are included in the same IC package. However, in other embodiments, the timing module and the bit manipulation module are included in separate IC packages. Although the illustrated CAN device is shown with certain components and described with certain functionality herein, other embodiments of the CAN device may include fewer or more components to implement the same, less, or more functionality. For example, although the CAN device is shown in FIG. 3 as including three timing engines, in other embodiments, the CAN device may include two timing engines or more than three timing engines.

In the embodiment depicted in FIG. 4, the timing module 442 includes the first, second, and third timing engines 444-1, 444-2, 444-3 and the timing engine resolver 446. Each of the first, second, and third timing engines have slightly different average clock frequencies. In some embodiments, the clock frequencies of the first, second, and third timing engines have small deviations with respect to a reference clock frequency. For example, the CAN protocol may specify that a transmitting CAN protocol engine has a clock frequency with an accuracy of ±0.5%. In this example, the clock frequency of the timing module may have a deviation of ±1.5% with respect to a reference clock frequency, and the clock frequencies of the first, second, and third timing engines may have deviations of +1%, 0%, −1% with respect to the clock frequency of the timing module. Consequently, out of the first, second, and third timing engines, there will always be a timing engine with a clock frequency that falls within the clock frequency range for a transmitting CAN node. Each of the first, second, and third timing engines may receive data bits from the CAN bus 404 and may, independently and in parallel, process the received data bits. Each of the first, second, and third timing engines may then output an indication that the received data bits were successfully detected as well as a message represented by the received data bits. The timing engine resolver may be configured to determine which, if any, of the first, second, and third timing engines indicate that the respective timing engine successfully detected the received data bits, and then provides the message to the bit manipulation module 448.

Figure 5:
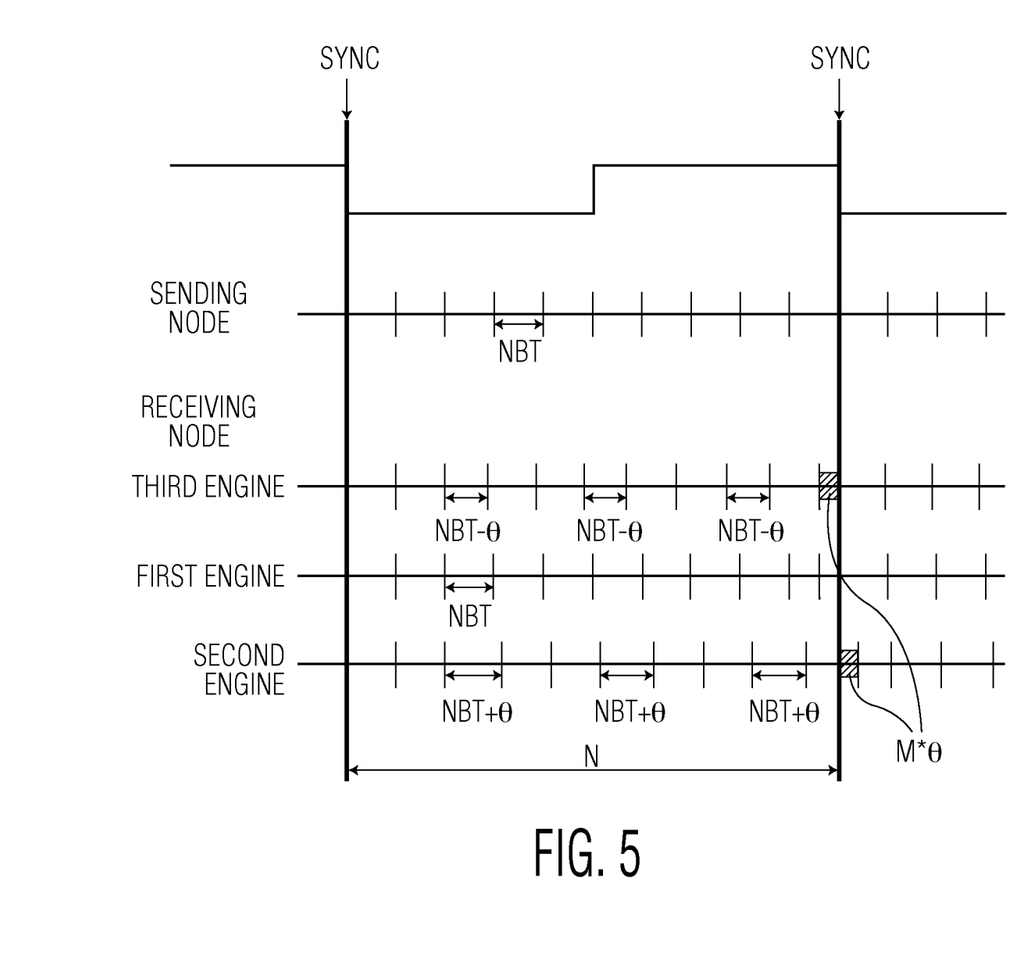
FIG. 5 illustrates an exemplary synchronization timing for the timing engines of the CAN device depicted in FIG. 4.

FIG. 5 illustrates an exemplary synchronization timing for the timing engines 444-1, 444-2, 444-3 of the CAN device 440 depicted in FIG. 4. Each of the first, second, and third timing engines have an average NBT that is related to the clock frequency of the respective timing engine. The average NBT is adapted for the second and third engines by adding/subtracting a delay 0 for M in N bits. Specifically, the first timing engine has a clock frequency $f_1$ with an average NBT. The second timing engine runs with an average NBT of:

$$\overline{NBT}_{(2)} = \frac{(N-M)*NBT + M*(NBT+\theta)}{N}, \quad (1)$$

which leads to a clock frequency of:

$$f_2 = 1/\overline{NBT}_{(2)} \quad (2)$$

The third timing engine runs with an average NBT of:

$$\overline{NBT}_{(3)} = \frac{(N-M)*NBT + M*(NBT-\theta)}{N}, \quad (3)$$

which leads to a clock frequency of:

$$f_3 = 1/\overline{NBT}_{(3)} \quad (4)$$

In the synchronization timing shown in FIG. 5, M is set to 3 and N is set to 10. Note that, for the second timing engine, NBT's are reduced by $\theta$ so that, at the end of a synch period bits, the total time difference versus the first timing engine is M*$\theta$. In a similar manner, for the third timing engine, the difference is increased by M*$\theta$.

Because the detection bandwidths of the first, second, and third timing engines 444-1, 444-2, 444-3 overlap, two (or even all) of the timing engines may indicate the successful receipt of a message. In such instances, the timing engine resolver 446 may select one of the two timing engines that indicated successful receipt of a message and may use that timing engine to provide the message to the bit manipulation module 448. In some embodiments, if two different timing engines both indicate successful receipt of a message, the timing engine resolver may then select the timing engine with the lowest timing error.

In an example of the operation of the CAN device 440 depicted in FIG. 4, at the beginning of each CAN data frame and on each synchronization event, the time basis of the first, second, and third timing engines 444-1, 444-2, 444-3 are restarted. During the reception of the CAN data frame, the calculated errors are summed. The actual error SJW at a synchronization event is:

$$SJW(i) = N*\theta \quad (5)$$

where $\theta$ is the mismatch of nominal bit time of the engine and the bit time of the incoming data, and N is the number of bits since the last synchronization event. The error of timing engine x (x is an integer) at synchronization event I is:

$$e_x(I) = \sum_{i=1}^{I} SJW(i) \quad (6)$$

Figure 6:
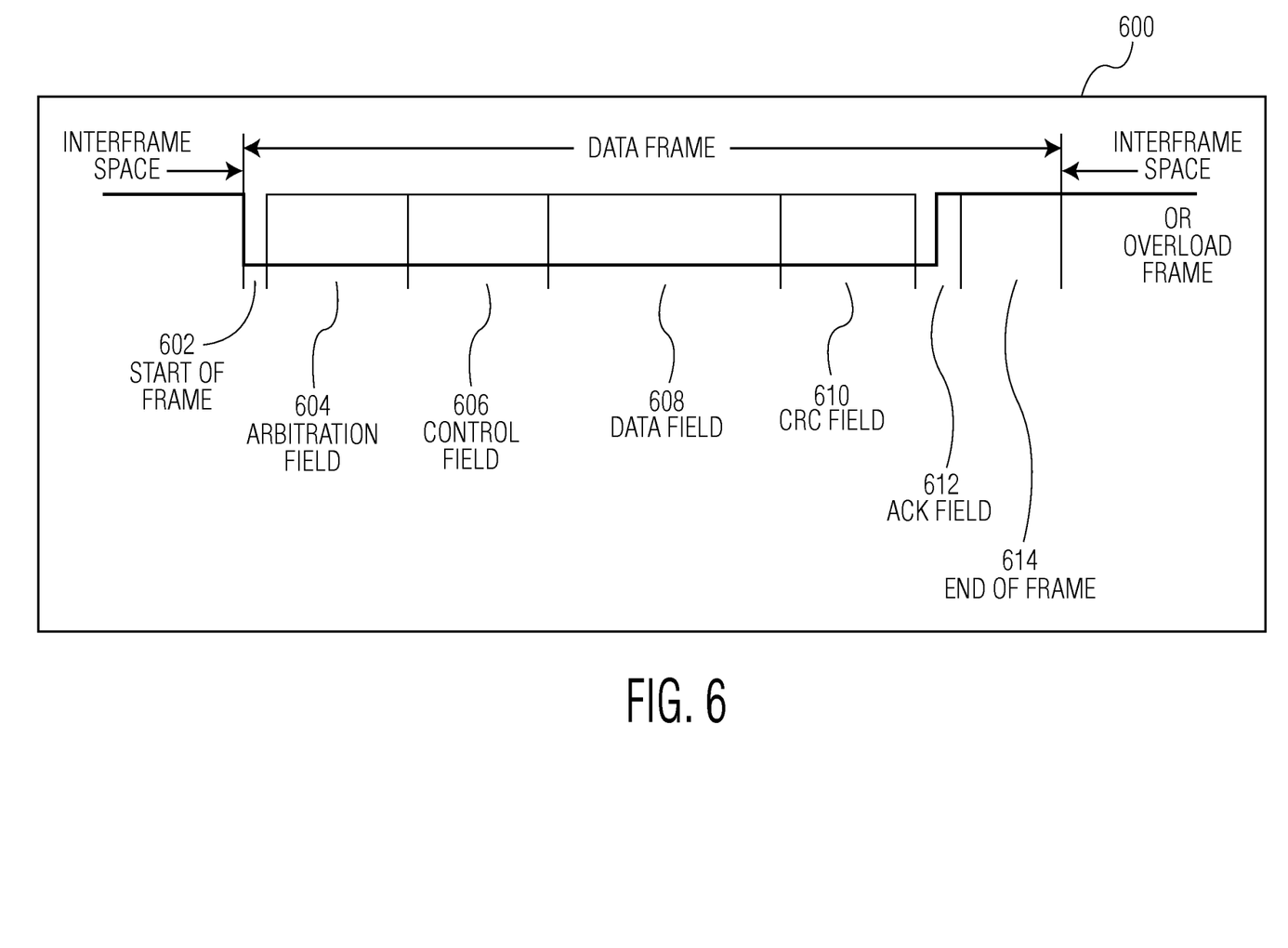
FIG. 6 depicts the format of a CAN data frame that is received at the CAN device depicted in FIG. 4.

FIG. 6 depicts the format of a CAN data frame 600 that is received at the CAN device 440 depicted in FIG. 4. The CAN data frame depicted in FIG. 6 may be an ISO 11898-1 frame 130 (in the classical base frame format (CBFF) or standard format) that is used in CAN normal mode or an ISO/DIS 11898-1 frame 132 (in the FD base frame format or FBFF) that is used in CAN FD mode. As depicted in FIG. 6, the CAN data frame includes a Start of Frame (SOF) field/phase 602, an arbitration field/phase 604, a control field/phase 606, a data field/phase 608, a Cyclic Redundancy Check (CRC) field/phase 610, an Acknowledgement (ACK) field/phase 612, and an End Of Frame (EOF) field/phase 614.

During the reception of the arbitration field 604 of the CAN data frame 600, there can be multiple CAN nodes in the CAN network that are transmitting their identifier (ID) on the CAN bus 404. However, due to delay in the CAN network, the dominant bits can be longer that the nominal bit time, which affects the measurement and can result in a higher timing error value, $e_x$, for the timing engines compared to an arbitration phase with a single active CAN node. It can even result in that the best matching engine has a higher timing error $e_x$ value than a less optimal engine. If the CAN data frame that is received meets all timing requirements as stated in ISO11898, the following lemma's are valid at the end of the arbitration field 604:

The best timing engine (lowest $\theta$) has not lost synchronization

Some timing engines with higher timing error value, $e_x$, than the best timing engine, may have sampled the same data during the arbitration field as the best engine. Consequently, it is desirable to choose these timing engines as candidate timing engines.

After the arbitration field 604 is received at the CAN device 440, the control field 606 is received at the CAN device. From the control field, until the acknowledge field, only the CAN node that has won the arbitration, is allowed to transmit. This means that during reception of the control field, no disturbance on the bit timing due to multiple senders is expected.

In the control and data fields 606, 608, additions to, modifications of, and removing of the bits can be performed by the bit manipulation module 448. For example, a CAN data frame formatted according to the CAN FD mode can be modified by the bit manipulation module into a format that is understandable by a classic CAN device or that can be skipped by a classic CAN device without entering an error state. To time these added/removed/modified bits, a single timing engine should be selected. Prior to the control and data field, a preselection of timing engines may be performed by the timing engine resolver 446. For example, the timing engine resolver may select the timing engine with the lowest timing error $e_x$ (the best timing engine) among all of the timing engines that have sampled the same data during the arbitration field 604. In addition to the best timing engine, the timing engine resolver may also select any of the other timing engines that have sampled the same data during the arbitration field as possible timing engine candidates. During reception of subsequent bits of the CAN data frame, a candidate timing engine may have a lower timing error than the previously selected best timing engine. In this case, the candidate timing engine is selected as the new best timing engine.

Timing engines that have a relative low timing error $e_x$, but have sampled different data are considered as being not reliable and will not be selected during the reception of the control field and the data field. During the reception of the control field and the data field, the summed errors of the preselected timing engines are evaluated concurrently or at selected moments. The selection of the timing engine for the subsequently received bits can change during the control and data fields, based on the timing error $e_x$. For long CAN data frames, the engine with the nominal bit timing closest to the bit timing of the received data is selected for the acknowledge field.

Figure 7:
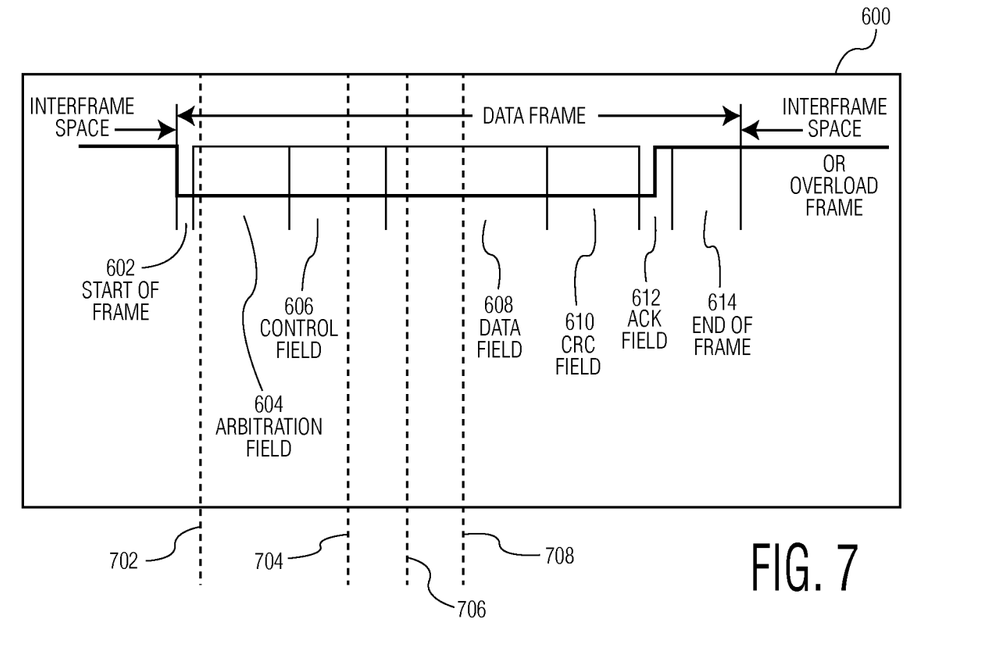
FIG. 7 depicts four synchronization edges during the reception of the CAN data frame depicted in FIG. 6.

A timing engine selection operation of the CAN device 440 during the reception of the CAN data frame 600 is described with reference to FIGS. 7 and 8. FIG. 7 depicts four synchronization edges 702, 704, 706, 708 during the reception of the CAN data frame 600 depicted in FIG. 6. At each synchronization edge, one or more timing engines is selected for the CAN device. As depicted in FIG. 7, a first synchronization edge 702 occurs during the arbitration field 604 and subsequent second, third and fourth synchronization edges occur during the data field 608. The second, third and fourth synchronization edges 704, 706, 708 may not occur right after the first synchronization edge. For example, one or more intermediate synchronization edges may occur between the first synchronization edge and the second synchronization edge.

Figure 8:
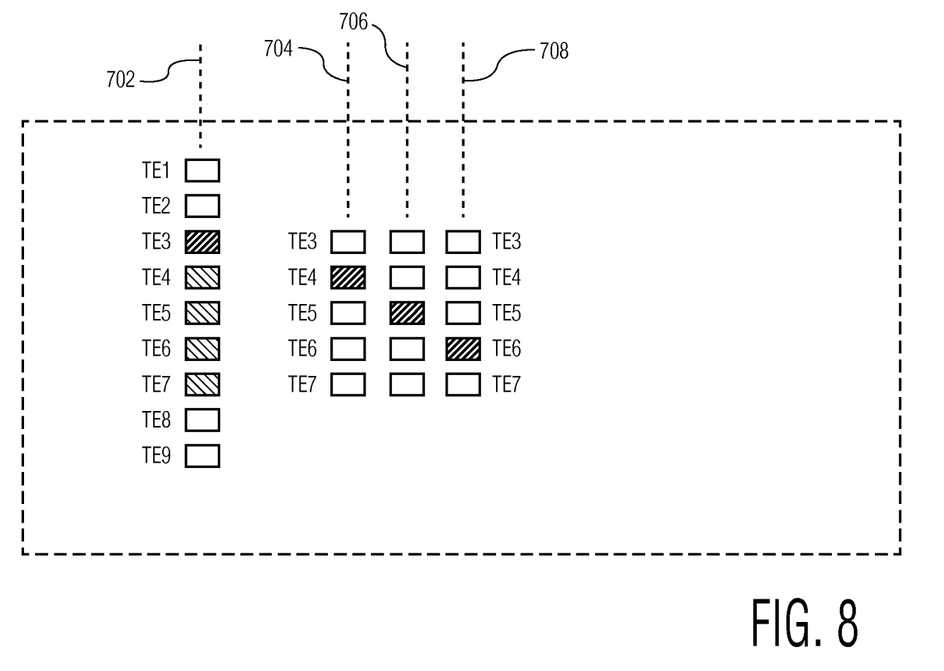
FIG. 8 depicts an example timing engine selection at the four synchronization edges depicted in FIG. 7.
Figure 9:
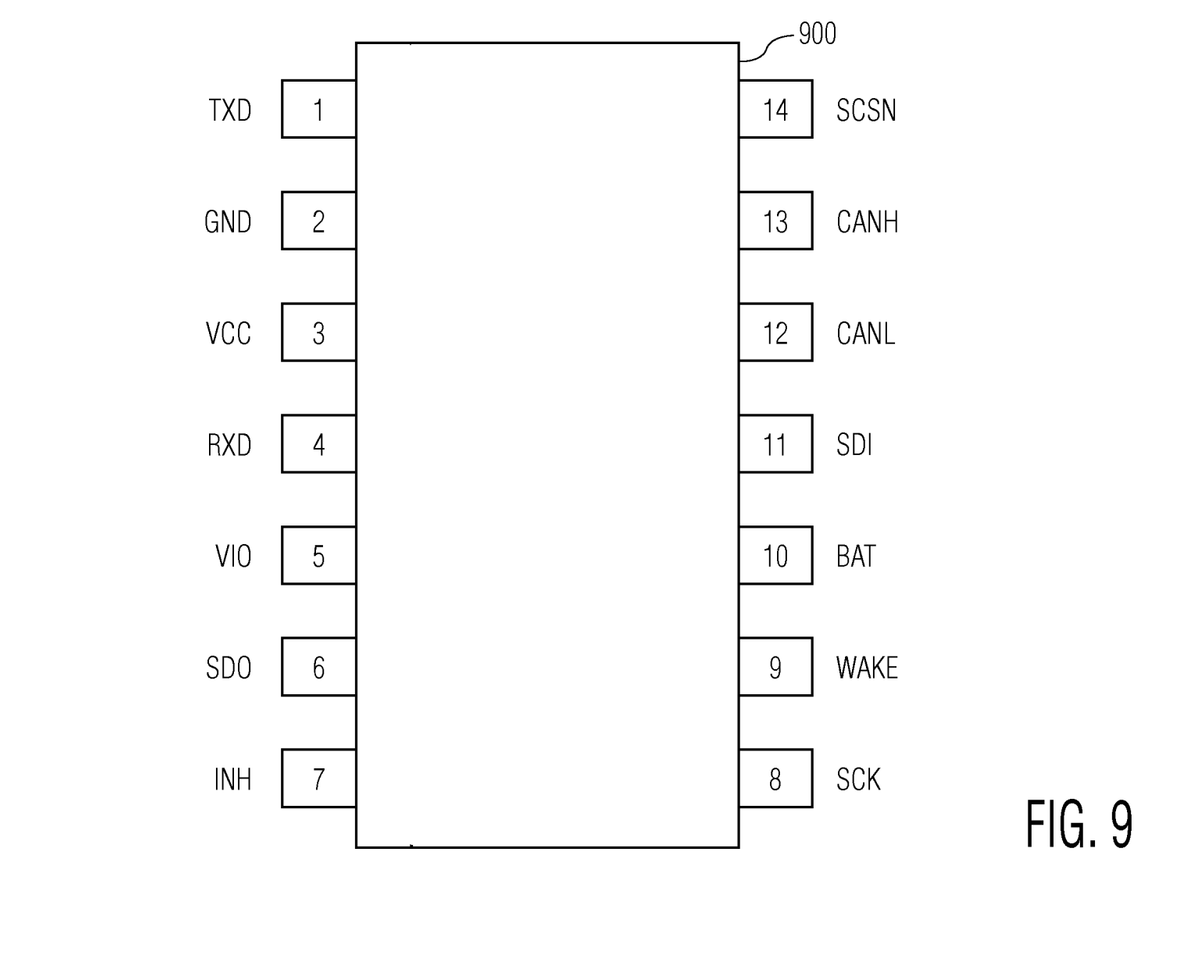
FIG. 9 depicts the CAN device depicted in FIG. 4 embodied as a packaged IC device.

FIG. 8 depicts the corresponding timing engine selection at the four synchronization edges depicted in FIG. 7. In the example shown in FIG. 8, a total of nine timing engines (TE1-TE9) are used in the CAN device 440. At the first synchronization edge 702, timing engine (TE3) is selected as the best timing engine and timing engines (TE4-TE7) are selected as possible timing engine candidates. The timing engines (TE4-TE7) have sampled the same data and the timing engine (TE3) has the lowest timing error among the timing engines (TE3-TE7). The timing engines (TE1-TE3, TE8, TE9) have sampled different data from the timing engines (TE4-TE7) and are no longer considered for the current CAN data frame. The timing engine (TE3) can be used to provide clock information for bit manipulation of subsequent bits of the CAN data frame 600. At the second synchronization edge 704, the timing engine (TE4) has the lowest timing error among the timing engines (TE3-TE7). Consequently, the timing engine (TE4) is selected as the best timing engine and is used to provide clock information for possible bit manipulation of subsequent bits of the CAN data frame. At the third synchronization edge 706, the timing engine (TE5) has the lowest timing error among the timing engines (TE3-TE7). Consequently, the timing engine (TE5) is selected as the best timing engine and is used to provide clock information for possible bit manipulation of subsequent bits of the CAN data frame. At the fourth synchronization edge 708, the timing engine (TE6) has the lowest timing error among the timing engines (TE3-TE7). Consequently, the timing engine (TE6) is selected as the best timing engine and is used to provide clock information for possible bit manipulation of subsequent bits of the CAN data frame. As illustrated in FIG. 9, the sampling clock frequency is being dynamically adjusted during the processing if a signal CAN data frame, which allows for a CAN transceiver to adapt on the fly within a single CAN data frame. This enables a CAN data frame to be manipulated before being passed to a corresponding CAN protocol controller and helps to prevent the CAN protocol controller from entering an error state.

FIG. 9 depicts the CAN device 440 depicted in FIG. 4 embodied as a packaged IC device 900. As shown in FIG. 9, the packaged IC device of the CAN device includes 14 pins/terminals, TXD (pin 1, transmit data input), GND (pin 2, ground), VCC (pin 3, supply voltage), RXD (pin 4, receive data output), VIO (pin 5, supply voltage for I/O level adaptor), SDO (pin 6, SPI data output), INH (pin 7, inhibit output for switching external voltage regulators), SCK (pin 8, SPI clock input), WAKE (pin 9, local wake-up input), BAT (pin 10, battery supply voltage), SDI (pin 11, Serial Peripheral Interface (SPI) data input), CANL (pin 12, LOW-level CAN voltage input/output), CANH (pin 13, HIGH-level CAN voltage input/output), SE (pin 8, operational mode selection) and SCSN (pin 14, SPI chip select input). The packaged IC device depicted in FIG. 9 is one possible packaged IC device of the CAN device depicted in FIG. 4. However, the packaged IC device of the CAN device depicted in FIG. 4 is not limited to the embodiment shown in FIG. 9. For example, although the pins are shown in FIG. 9 as locating outside of the packaged IC device, in other embodiments, some or all of the pins may locate inside/within the packaged IC device. In another example, in embodiments where the CAN device does not include RXD/TXD interfaces, the packaged IC device does not include TXD/RXD pins. In yet another example, the packaged IC device may include more than 14 pins to implement more I/O functions or less than 14 pins to implement less I/O functions. In an embodiment, the packaged IC device includes 8 pins/terminals, TXD (pin 1), GND (pin 2), VCC (pin 3), RXD (pin 4), n.c. (pin 5, not connected), CANL (pin 6), CANH (pin 7), and STB (pin 8, Standby mode control input).

Figure 10:
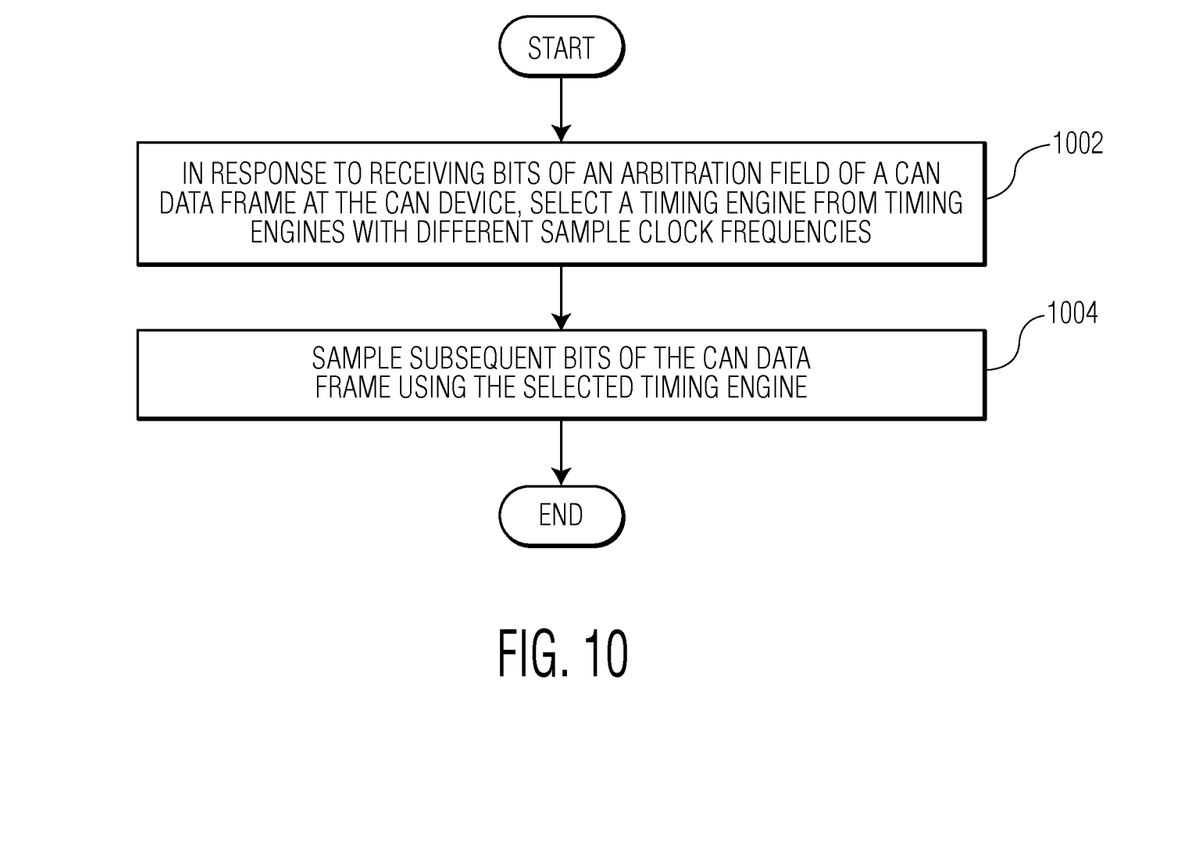
FIG. 10 is a process flow diagram of a method for operating a CAN device in accordance with an embodiment of the invention.

FIG. 10 is a process flow diagram of a method for operating a CAN device in accordance with an embodiment of the invention. At block 1002, in response to receiving bits of an arbitration field of a CAN data frame at the CAN device, a timing engine is selected from timing engines with different sample clock frequencies. At block 1004, subsequent bits of the CAN data frame are sampled using the selected timing engine. The CAN device may be the same as or similar to the CAN node 102 depicted in FIGS. 1 and 2, the CAN transceiver 120 depicted in FIGS. 1 and 2, and/or to the CAN device 440 depicted in FIG. 4.

Techniques described herein can be applied to any type of In-Vehicle Networks (IVNs), including a CAN, a LIN, a MOST network, a FlexRay™ compatible network, and other types of IVNs. Although in some embodiments a CAN device is described, it should be noted that the invention is not restricted to CAN devices. In an embodiment, the above-described techniques can be applicable to CAN, CAN-FD, and ISO 11898 compliant networks. The above-described techniques can be implemented in a CAN device such as a CAN transceiver IC device, a microcontroller IC device, or an IC device that includes both a CAN transceiver and a microcontroller.

In an embodiment, "CAN messages" refers to CAN "data frames," which are CAN data frames with the RTR bit set to "0" as specified in the CAN protocol. CAN "data frames" are the CAN data frames that carry payload data (e.g., in the DATA field) that could be used for malicious intent and thus the CAN "data frames" are important to monitor for intrusion detection/prevention. CAN data frames with the RTR bit set to "1" are referred to in the protocol as "remote frames" and such frames do not include payload data because the function of "remote frames" is simply to request transmission of a CAN data frame with the same identifier. Remote frames with the same identifier as a corresponding CAN data frame can be transmitted by all of the other CAN nodes (e.g., all of the CAN nodes other than the CAN node that is in charge of sending the Data Frame with the same identifier). Therefore, it would not make sense to store an identifier of an outgoing CAN remote frame, and it would not make sense to check an incoming CAN remote frame for a matching identifier.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for operating a Controller Area Network (CAN) device, the method comprising:
    in response to receiving bits of an arbitration field of a CAN data frame at the CAN device and before all of the bits of the CAN data frame have been received at the CAN device and at a synchronization edge of a received bit, selecting a timing engine from a plurality of timing engines at the CAN device, wherein the timing engines at the CAN device have different sample clock frequencies and wherein the timing engines at the CAN device process the received bits of the arbitration field of the CAN data frame temporally in parallel such that each one of the plurality of timing engines is sampling the same bit of the arbitration field temporally in parallel with the other timing engines; and
    sampling subsequent bits of the CAN data frame at the CAN device using the selected timing engine.

2. The method of claim 1, further comprising modifying at least some of sampled subsequent bits of the CAN data frame using the sample clock frequency of the selected timing engine.

3. The method of claim 2, wherein the CAN data frame further comprises a data field, and wherein sampling the subsequent bits of the CAN data frame using the selected timing engine comprises sampling bits of the data field of the CAN data frame using the selected timing engine.

4. The method of claim 3, wherein modifying the at least some of the sampled subsequent bits of the CAN data frame comprises modifying at least some of the sampled bits of the data field using the sample clock frequency of the selected timing engine.

5. The method of claim 1, wherein selecting a timing engine comprises selecting a best timing engine and at least one candidate timing engine, and wherein the best timing engine exhibits the lowest timing error among the best timing engine and the at least one candidate timing engine.

6. The method of claim 5, wherein the best timing engine and the at least one candidate timing engine sample the same data from the received bits of the arbitration field.

7. The method of claim 5, further comprising evaluating the best timing engine and the at least one candidate timing engine based on the subsequent bits of the CAN data frame.

8. The method of claim 7, wherein evaluating the best timing engine and the at least one candidate timing engine based on the subsequent bits of the CAN data frame comprises selecting a second timing engine with the lowest timing error among the best timing engine and the at least one candidate timing engine, and wherein the method further comprises sampling further bits of the CAN data frame that are received after the subsequent bits of the CAN data frame using the second timing engine.

9. A Controller Area Network (CAN) device, the CAN device comprising:
    a plurality of timing engines, wherein the timing engines of the CAN device have different sample clock frequencies and wherein the timing engines of the CAN device are configured to process received bits of an arbitration field of a CAN data frame temporally in parallel such that each one of the plurality of timing engines is sampling the same bit of the arbitration field temporally in parallel with the other timing engines; and
    a timing engine resolver configured to, in response to receiving the bits of the arbitration field of the CAN data frame at the CAN device and before all of the bits of the CAN data frame have been received at the CAN device and at a synchronization edge of a received bit, select a timing engine from the plurality of timing engines of the CAN device, wherein the selected timing engine samples subsequent bits of the CAN data frame.

10. The CAN device of claim 9, further comprising a bit manipulation module configured to modify at least some of sampled subsequent bits of the CAN data frame using the sample clock frequency of the selected timing engine.

11. The CAN device of claim 10, wherein the CAN data frame further comprises a data field, and wherein the selected timing engine samples bits of the data field of the CAN data frame.

12. The CAN device of claim 11, wherein the bit manipulation module is further configured to modify at least some of the sampled bits of the data field using the sample clock frequency of the selected timing engine.

13. The CAN device of claim 9, wherein the timing engine resolver is further configured to select a best timing engine and at least one candidate timing engine, and wherein the best timing engine has the lowest timing error among the best timing engine and the at least one candidate timing engine.

14. The CAN device of claim 13, wherein the best timing engine and the at least one candidate timing engine sample the same data from the received bits of the arbitration field.

15. The CAN device of claim 14, wherein the timing engine resolver is further configured to evaluate the best timing engine and the at least one candidate timing engine based on the subsequent bits of the CAN data frame.

16. The CAN device of claim 15, wherein the timing engine resolver is further configured to select a second timing engine with the lowest timing error among the best timing engine and the at least one candidate timing engine, and wherein the second timing engine samples further bits of the CAN data frame that are received after the subsequent bits of the CAN data frame.

17. A non-transitory computer-readable storage medium containing program instructions for operating a Controller Area Network (CAN) device, wherein execution of the program instructions by one or more processors of the computer system causes the one or more processors to perform steps comprising:

in response to receiving bits of an arbitration field of a CAN data frame at the CAN device and before all of the bits of the CAN data frame have been received at the CAN device and at a synchronization edge of a received bit, selecting a timing engine from a plurality of timing engines at the CAN device, wherein the timing engines at the CAN device have different sample clock frequencies and wherein the timing engines at the CAN device process the received bits of the arbitration field of the CAN data frame temporally in parallel such that each one of the plurality of timing engines is sampling the same bit of the arbitration field temporally in parallel with the other timing engines; and sampling subsequent bits of the CAN data frame at the CAN device using the selected timing engine.

18. The non-transitory computer-readable storage medium of claim 17, the steps further comprising modifying at least some of the sampled subsequent bits of the CAN data frame using the sample clock frequency of the selected timing engine.

* * * * *